(12) United States Patent  
Mak

(10) Patent No.: US 6,424,926 B1  
(45) Date of Patent: Jul. 23, 2002

(54) BUS SIGNATURE ANALYZER AND BEHAVIORAL FUNCTIONAL TEST METHOD

(75) Inventor: Tak M. Mak, Union City, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/540,753

(22) Filed: Mar. 31, 2000

(51) Int. Cl.$^7$ .............................................. G06F 15/173
(52) U.S. Cl. ........................................ 702/117; 714/30
(58) Field of Search .................. 702/117, 118–121; 714/1, 2, 100, 5, 6, 10, 25, 30, 44, 45, 718, 719, 724, 732–734; 716/4; 703/13–17, 20–21, 23, 26, 28

(56) References Cited

U.S. PATENT DOCUMENTS

| | | | | |
|---|---|---|---|---|
| 4,513,418 A | * | 4/1985 | Bardell et al. ............... | 714/726 |
| 4,608,691 A | * | 8/1986 | Lynch ......................... | 714/732 |
| 5,539,753 A | * | 7/1996 | Connor et al. ................ | 714/30 |
| 5,583,786 A | * | 12/1996 | Needham ..................... | 714/724 |
| 5,617,531 A | * | 4/1997 | Crouch et al. ................ | 714/10 |
| 5,790,561 A | * | 8/1998 | Borden et al. ............... | 714/724 |
| 5,805,792 A | * | 9/1998 | Swoboda et al. ............. | 714/25 |
| 5,867,409 A | * | 2/1999 | Nozuyama ................... | 377/72 |
| 5,930,270 A | * | 7/1999 | Forlenza et al. ............ | 714/732 |
| 5,938,784 A | * | 8/1999 | Kim ........................... | 714/733 |
| 6,145,105 A | * | 11/2000 | Nadeau-Dostie et al. ... | 714/726 |
| 6,154,824 A | * | 11/2000 | Robertson et al. .......... | 711/202 |
| 6,199,184 B1 | * | 3/2001 | Sim ............................ | 714/732 |
| 6,249,892 B1 | * | 6/2001 | Rajsuman et al. .......... | 714/727 |
| 6,327,685 B1 | * | 12/2001 | Koprowski et al. ......... | 365/201 |

* cited by examiner

Primary Examiner—Marc S. Hoff  
Assistant Examiner—Edward Raymond  
(74) Attorney, Agent, or Firm—Kenyon & Kenyon

(57) ABSTRACT

A bus signature analyzer (BSA) device and method to provide high-speed functional testing of a highly integrated circuit (IC) are provided such that existing automatic test equipment (ATE) can be used. The BSA includes a serially-connected multiple input signature register (MISR), which is coupled to the highly integrated circuit, having a feedback circuit coupled to an output of the MISR to receive an output signal and the feedback circuit being coupled to a plurality of inputs of the MISR to feedback the output signal to the plurality of inputs. The BSA further includes a control circuit coupled to the MISR, such that the control circuit enables the MISR to compress an outgoing data signal, which represents the functional behavior of the IC being tested, into a signature on a valid bus cycle. The method includes disabling the IC to prevent the execution of a diagnostic test program which is loaded into the IC to test the performance of the IC, permitting the IC to execute the diagnostic test program, generating bus cycles, compressing data from the diagnostic test program into a signature in the BSA and outputting the signature to be compared against a known defect-free signature.

30 Claims, 8 Drawing Sheets

BUS SIGNATURE ANALYZER AND BEHAVIORAL FUNCTIONAL TEST METHOD

FIELD OF THE INVENTION

The present invention relates to a bus signature analyzer device and method to enable high-speed functional testing of integrated chip components by using a bus enable signal to control signature compression of the bus activities during functional testing.

BACKGROUND

Testing of high speed buses, as well as all of the internal speed paths from a processor to the bus interface, requires high speed and high pin count testers. As technology advances have continued to occur new and faster chips have been developed, which exceed the testing capabilities of existing automatic test equipments (ATEs). Additionally, the ATE solutions that would be required to test these new chips are becoming too costly to build. As a result, speed paths between multiple clock domains are not currently being tested due to the limitations of the available ATEs and structural test techniques.

Initially, equipments and integrated circuits were only functionally tested to determine simply if they worked. This was, and still is, accomplished by coupling an ATE to the piece of equipment or integrated circuit being tested. An example of how an ATE is coupled to a processor chip to test the processor chip is provided in FIG. 1. In FIG. 1, a processor chip 100 is shown to include a central processor unit (CPU) 110 coupled to a cache 120 and a memory controller 130 via a front side bus (FSB) 115. The memory controller 130 is coupled to an ATE 160. The ATE 160 is used to test the functionality of the processor chip 100 and the memory controller 130 by receiving bus cycle activity created by the processor chip 100 and the memory controller 130 and comparing this received bus cycle activity with a known defect-free or expected bus cycle activity. If the received and known bus cycle activities match, then the processor chip 100 and the memory controller 130 pass the test and are accepted as good and if the bus cycle activities do not match, then the processor chip 100 and the memory controller 130 fail the test and are rejected. In this configuration, the ATE 160 is used to load the test program through the memory controller 130 and receive the outputs via a bus 162 which couples the ATE 160 to the memory controller 130. Unfortunately, ATEs have historically only been able to operate at a fraction of the clock speeds of the latest CPUs and memories. For example, while current ATEs can only operate at speed of up to 200 MHz, current generation CPUs and memories can operate at speeds of from 300 to 800 MHz and above and, as a result, the ATE 160 illustrated in FIG. 1 cannot measure the internal performance of the CPU 110 or the memory controller 130.

Unfortunately, while this method of ATE testing works well with simple systems and individual integrated circuits, current ATEs are unable to determine the performance of internal speed paths in highly integrated circuits. For example, due to the above noted inherent speed limitations, current ATEs cannot measure the performance of the new generation, fast and highly integrated circuits. Similarly, since the ATE 160 is measuring a combined output result from the memory controller 130, the ATE 160 is not able to determine what each of the involved components contributed to the result.

Subsequently, structural testing methods and systems were developed called built-in self-test (BIST) to test the individual internal integrated circuits of the equipments. Examples of these methods include a Linear Feedback Shift Register (LFSR) and a Multiple Input Signature Registers (MISR), which is a variant of the LFSR. Both the LFSR and MISR are used to perform signature analysis of the chip being tested. An example of one of many possible configurations of a generic MISR 200, which can be used as a signature analyzer, is shown in FIG. 2. In FIG. 2, the generic MISR 200 is illustrated in which n-bit D-type flip-flops 210-1–210-n are serially coupled together and coupled to a feedback circuit 220 to produce compressed signatures on every clock cycle. While the feedback circuit is shown feeding back an output signal Q from the nth flip-flop of the serially-connected flip-flops 210-1–210-n to each flip-flop 210-1–210-n, the feedback circuit can be configured to feedback to any number of the flip-flops 210-1–210-n. However, since the generic MISR 200 compresses the signal on every clock cycle, regardless of whether it is a valid bus cycle or not, the generic MISR 200 is vulnerable to X-states and circuit glitches. "X-states" are unknown and undefined processor states which can occur during processor execution of application programs as a result of, for example, uninitiated nodes, signal contention as a result of internal circuit conflicts, and/or circuit glitches. "Circuit glitches" can include, for example, errors, transients and/or unintelligible signals.

In FIG. 2, adders 230-1–230-n, which are generally implemented as exclusive OR (XOR) gates without the carry function, can each include an input channel to receive a bit from an output signal from a device to be tested as an input signal. The received bit from the output signal is combined in the XOR gate with the feedback circuit output signal Q and a second output signal Q from the predecessor flip-flop in the sequence of the serially-connected flip-flops 210-1–210-n–1. As FIG. 2 illustrates, since the first XOR gate 230-1 does not have a predecessor flip-flop, the first XOR gate 230-1 only receives and combines the received output signal from the tested device and the feedback circuit output signal Q.

Unfortunately, since most current signature analyzers require full compliance with a specific design methodology, for example, Scan which requires no contention problems, these signature analyzers are unable to test the buses and integrated chip components that are not built according to the specific design methodology requirements.

Recently, a new structural test technique called Structural Based Functional Test (SBFT), which runs functional tests from embedded caches, has been developed. SBFT calls for the use of scanout nodes to capture internal data as well as bus data. However, since the scanout technique compresses data on every clock cycle, the signature is easily contaminated with X-states. Although these X-states may be benign in normal operations, they will cause the signature produced to be unreliable and thus unusable. As a result, to make the normal scanout signature compression solution work would require lengthy debug and extensive design fixes to overcome the X-state induced problems.

Unfortunately, since the current ATE systems are not capable of the same high speeds as the new chip and memory component designs, the current ATE systems can not be used to directly test these new high-speed integrated circuits. Similarly, since many new devices exceed the pin count capability of the current ATE systems, not all pins of these new devices can be connected to the ATEs and, thus, these high pin count devices can not be tested on the current ATE systems.

Therefore, a device and method are needed that will perform high speed functional testing of high-speed bus and integrated chip components and buses and integrated chip components with pin counts which exceed the capabilities of current test equipment and for integrated circuits and chips.

DETAILED DESCRIPTION

In an embodiment of the present invention a bus signature analyzer (BSA) device and method enable speed path testing of a chip by compressing bus signatures output from the chip without the need for high speed or high pin count testers. The device and method use existing Design-For-Test (DFT) techniques to compress all outgoing bus cycles during a functional test. The functional test can be enabled by preloading the diagnostic test programs into the internal on-chip cache of most modern microprocessors. In an embodiment of the present invention the device uses a bus enable signal to control the signature compression of the bus activities to occur only during a valid bus cycle during the functional test. As a result, while the chip is not performing a valid transaction, the bus signature analyzer will not take in and compress any invalid signals which are not intended to be part of the bus transaction. By not compressing any invalid signals, there is no need to ensure that the design is free of X-states or contention. For complex microprocessors, ensuring that the design is free of X-states or contention can be a very resource and time consuming activity. Since no invalid signals will be compressed, the resulting signature from the BSA is an accurate and valid measure of the performance of the tested integrated circuit.

In embodiments of the present invention, since the bus is already enabled to write data only when valid data are present, the circuitry needed to supply this capability is small. As a result, the BSA can be designed to match the speed of the I/O buses as simple logic and circuits are involved.

In embodiments of the present invention, all outgoing data paths can be tested at the speed of the tested integrated circuit with a low speed ATE. The role of the ATE is to set up the test mode, load the cache with the test program and data, let the processor execute and receive the output signature. All of the resulting, that is, valid, bus cycles can be compressed into a signature which can be downloaded by the tester, at the lower speed of the tester, to verify the tested integrated circuit's speed and functionality after the high-speed test is complete.

Since embodiments of the present invention can use the natural data pathways of the integrated circuits being tested, there is no need for special bus fractions or any other ATE-related limitation. Any bus fractions can be programmed and tested without constraints. Likewise, the CPU and any intermediate interfaces can be programmed to run at the worst case condition, that is, at maximum speed, or at any desired speed combination.

Figure 2:
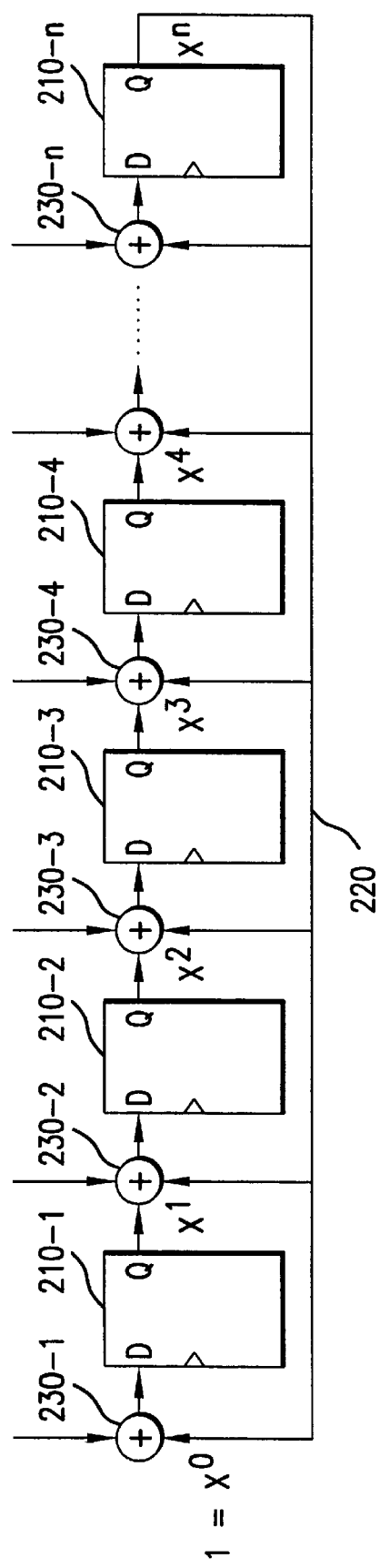
FIG. 2 is an illustration of a prior art generic multiple input signature register (MISR) which is currently used as a generic signature analyzer to perform signal compression on every clock cycle.
Figure 3:
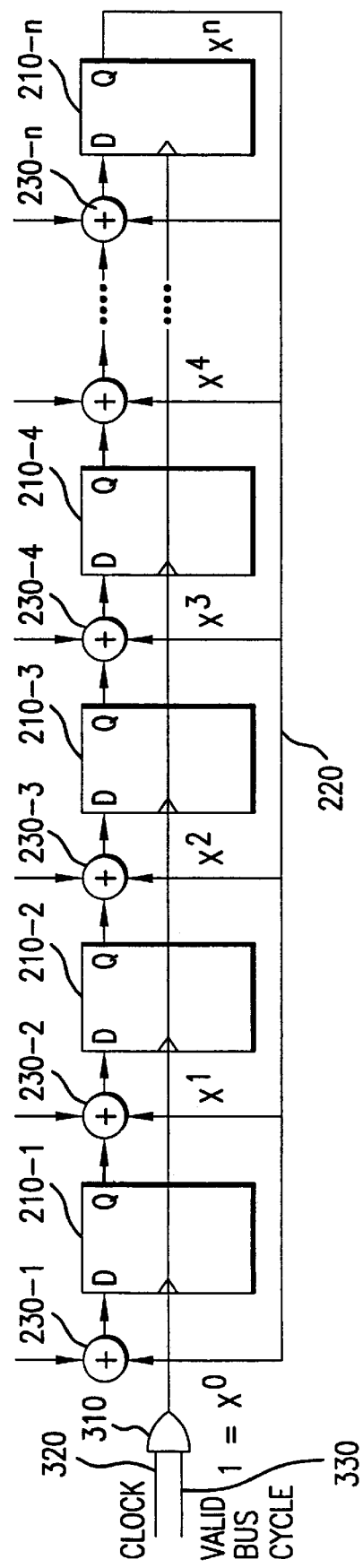
FIG. 3 is an illustration of a bus signature analyzer (BSA) implemented using a generic MISR with a control circuit in accordance with an embodiment of the present invention.

FIG. 3 is an illustration of a bus signature analyzer (BSA) 300 implemented using a generic MISR with a control circuit in accordance with an embodiment of the present invention. In FIG. 3, the generic MISR 200 described in FIG. 2 is coupled to an AND gate 310, which receives as inputs a system clock signal 320 and a bus enable signal 330. In this embodiment of the present invention, the AND gate 310 logic controls the operation of the BSA so that signal compression only occurs on valid bus cycles, which occur when both the system clock signal 320 and the bus enable signal 330 are present. Limiting the signal compression to occur only during valid bus cycles avoids the problems and errors associated with X-states and design glitches. In embodiments of the present invention, limiting the signal compression to occur only during valid bus cycles can be implemented using a WriteEnable (WE) or a similar signal to indicate to the peripherals that a valid address or data is forthcoming. As a result the BSA 300 will only compress the signature when valid data is presented.

Figure 1:
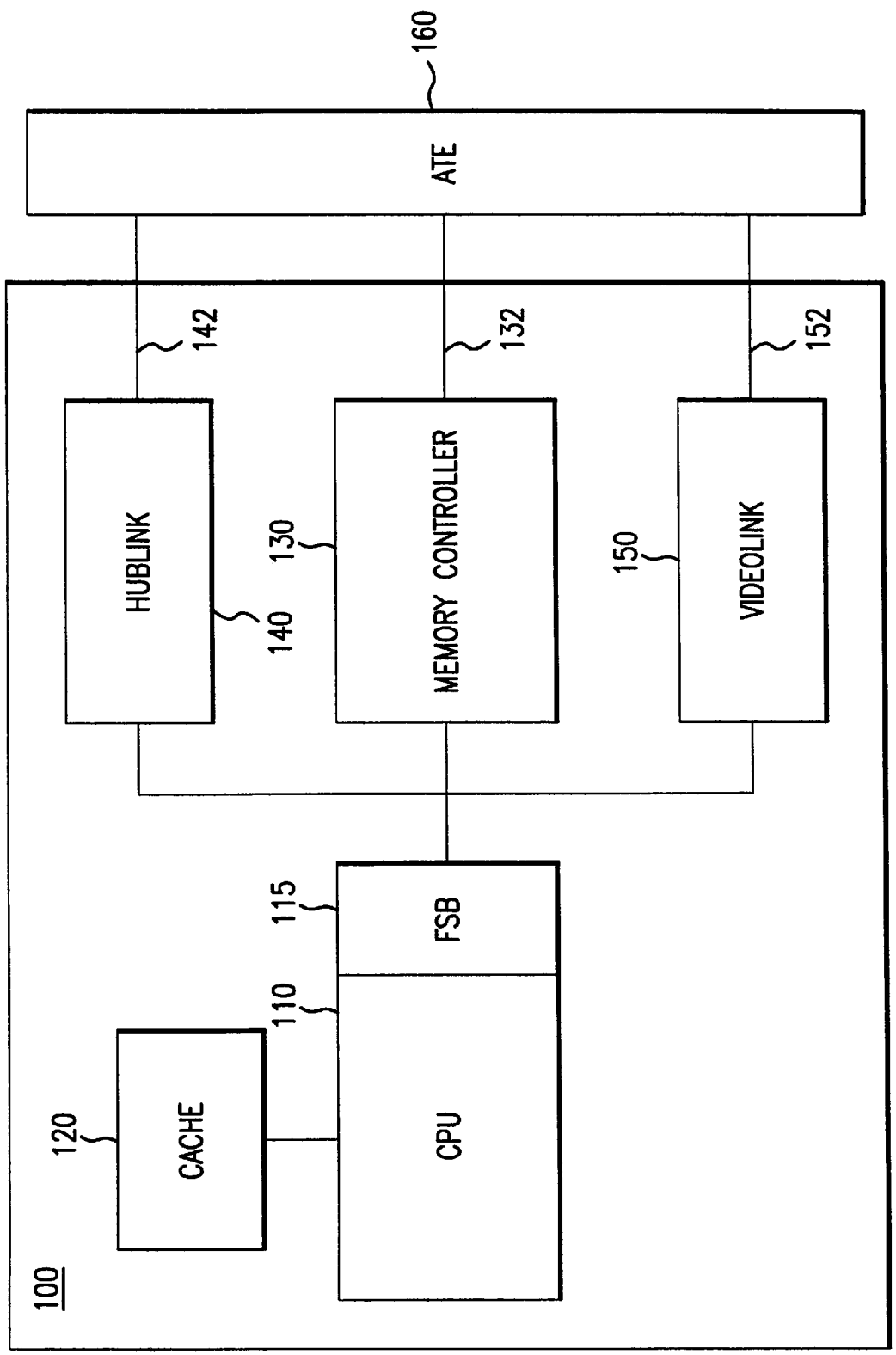
FIG. 1 is an illustration of how existing ATEs can be used to test a computer system on a single chip.
Figure 4:
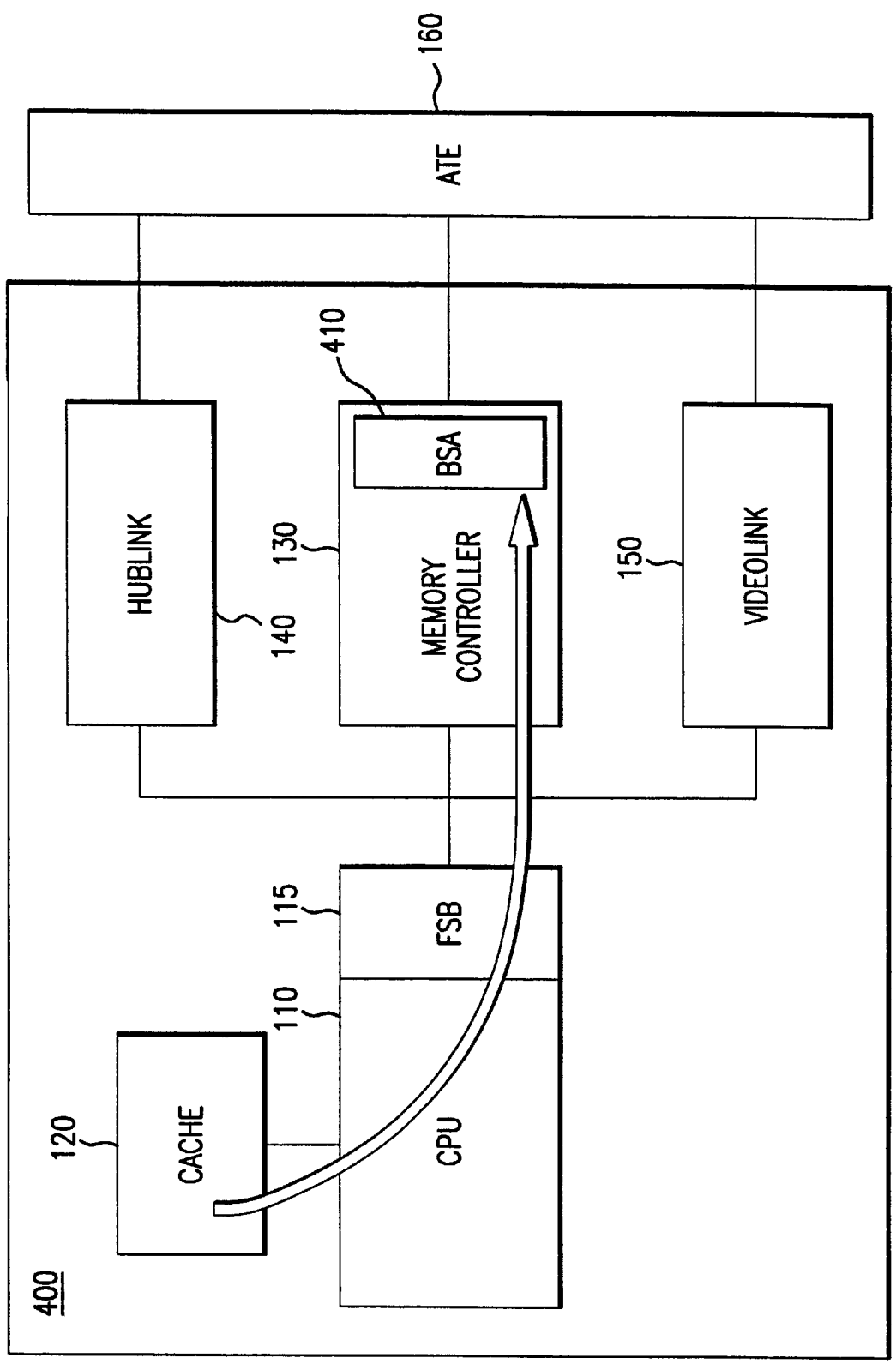
FIG. 4 is an illustration of a single BSA implemented in a single-chip processor device to test an outgoing data path performance in accordance with an embodiment of the present invention.

FIG. 4 illustrates a single processor chip 400 coupled to a memory controller 130 with a BSA 410, in accordance with an embodiment of the present invention, which can be used to perform an overall speed functional test of the outgoing data paths on the single processor chip 400. In FIG. 4, components which are common with FIG. 1 retain the original numbering used in FIG. 1. Returning to FIG. 4, the ATE 160 is now shown coupled to the hublink 140 and can be used to load the diagnostic test program into the cache 120 at whatever bus fraction speed is implemented in the single processor chip 400 that the ATE 160 can support. While in this embodiment of the present invention, the cache 120 is shown separate from the CPU 110 and the ATE 160 is shown coupled to the hublink 140, the embodiment is merely intended to be illustrative and should not be considered to limit the present invention to only this configuration. For example, in alternative embodiments of the present invention, the cache 120 can be embedded on the CPU 10 and the diagnostic test program can be permanently stored on the single processor chip 400. Similarly, embodiments of the present invention can be implemented in embedded and non-embedded logic and graphic chips. In another embodiment of the present invention, loading the diagnostic test program into the cache 120 can be automatically initiated as part of the processor chip 100 reset cycle. Regardless of how the diagnostic test program is loaded, in order to ensure the proper execution of the diagnostic test program, a small modification to the processor chip 400 control logic to prevent the CPU 110 from beginning execution until the diagnostic test program is completely loaded into the cache 120. This permits, for example, the ATE 160 to load the cache at whatever bus fraction speed the ATE 160 can support without being concerned that the CPU 110 will begin executing the diagnostic test program before the diagnostic test program is completely loaded into the cache 120.

In FIG. 4, once the diagnostic test program is loaded, the CPU 110 can be released to execute the diagnostic test program from the cache 120 at full CPU 110 speed and bus speed. As with the standard functional test, the intended behavior can be directed to a bus with a tester that can constantly monitor the signals on the bus. However, instead of using a tester, for example, the ATE 160, to monitor the bus at all times, a bus signature analyzer (BSA) 410 can be coupled to the memory controller 130 which is only enabled to monitor and compress the bus signals on valid bus cycles by using the normal bus enable logic. That is, if the CPU 110 is not performing a write operation to the memory controller 130, then the bus enable signal is off and the BSA 410 is not active and, thus, not compressing any write signals into a signature. If the CPU 110 attempts a write operation, then the bus enable signal, which signals a bus write operation, is turned on, which causes the BSA 410 to compress the outgoing data and, thus, forms a new signature.

After the entire test is completed, the signature can be downloaded through a scan chain or other similar test access port for comparison to the expected signature. For example, in the embodiment shown in FIG. 4, the signature can be downloaded from the BSA 410 to the ATE 160 to perform the comparison. An "expected signature" can be obtained by having previously run the diagnostic test program on golden units and saving the resultant signature for use as the expected signature. "Golden units" are generally units that are considered to be perfect and without flaws. As a result, there is no need to run extensive logic simulations to acquire the expected signature.

Since the bus enable signal is part of the normal function of the bus, the data signals that are taken in will be valid and deterministic. In addition, an embodiment of the BSA 410, in accordance with the present invention, can be applied to any digital bus, for example, an address bus, a graphics bus, a memory bus, etc. which is coupled to the chip being tested.

In FIG. 4, since the BSA 410 only presents a small additional capacitive loading to the bus, which usually drives heavy loads, the BSA 410 loading will not effect the overall chip performance. In embodiments of the present invention, not only is there effectively no performance penalty to this DFT technique, but the on-die area required to implement the BSA 410 as a set of latches and the AND gate to control the clocking of the BSA 410 is very small.

In embodiments of the present invention, the diagnostic test programs can be written so that the chip being tested can only read the necessary diagnostic test program instructions and data from the cache 120. This is to prevent external accesses which would require a read over the bus, which cannot operate at the same speed as the chip being tested, to the ATE 160 and which would not produce an accurate test of the chip's performance. Having the diagnostic test program run completely from within the cache 120 is not difficult since the storage capacity of most of today's processor chip caches can range from hundreds of kilobytes (KB) to several megabytes (MB) and the size of the diagnostic test program can be limited to fit within the available cache memory size.

In an embodiment of the present invention, the testing and signature generation process for outgoing data paths from the CPU 110 to the memory controller 130 includes:

1. Loading the cache 120 with the diagnostic test program at a low bus fraction speed, for example, from the ATE 160 while preventing the CPU 110 from executing the diagnostic test program until it has been totally loaded into the cache 120.
2. Releasing the CPU 110 to enable full speed data path execution of the diagnostic test program stored in the cache 120.
3. Generating write bus cycles to the memory controller 130 from the diagnostic test program.
4. Compressing bus activities in the BSA 410 to create a signature.
5. Downloading the signature to the ATE 160 from the BSA 410.
6. Comparing the downloaded signature to an expected signature.

Figure 5:
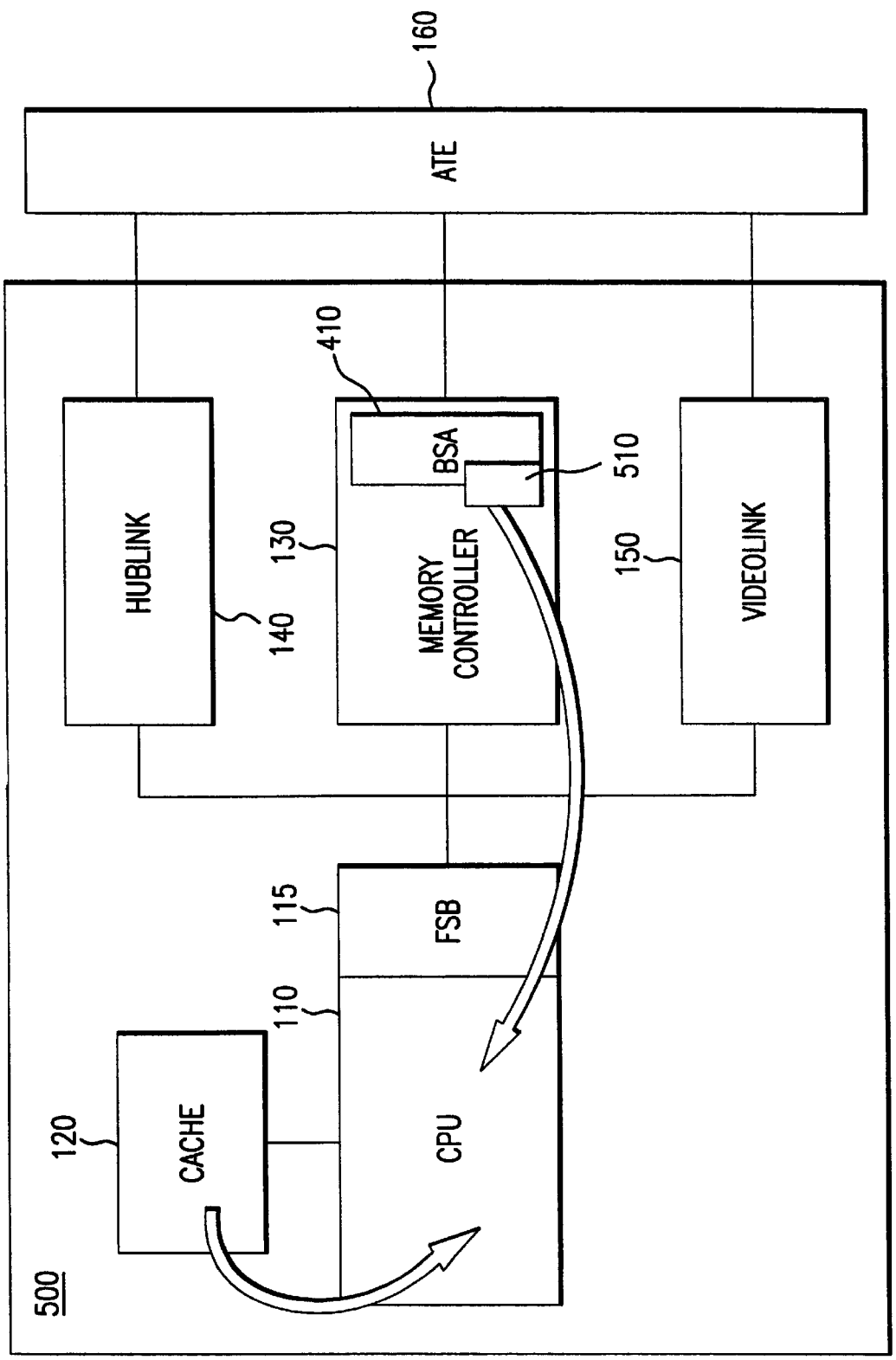
FIG. 5 is an illustration of another embodiment of a single BSA configuration to test an incoming data path performance in accordance with the present invention.

FIG. 5 illustrates another embodiment of a single BSA implemented in the single processor chip 400 in FIG. 4 to test the performance of the incoming data paths in the CPU 110, in accordance with the present invention. As in FIG. 4, in the embodiment of the system in FIG. 5, modifications have been made to a single processor chip 500 to prevent the CPU 110 from beginning execution of the diagnostic test program until the program has been completely loaded into the cache 120. In FIG. 5, the ATE 160 is still shown coupled to memory controller 130, hublink 140 and videolink 150 to load the diagnostic test program into the cache 120. In an embodiment of the present invention, the diagnostic test program can be configured to read incoming memory data and compress the data into a signature in the CPU 110. In FIG. 5, the BSA 410 is coupled to a pseudo-random pattern generator 510 which generates bus cycles for each read operation into the CPU 110 for use in creating the signature. In another embodiment of the present invention, a separate BSA can be included in the CPU to control the creation of the signature from the incoming data from the memory controller 130.

In an embodiment of the present invention, the testing and signature generation process for measuring the performance of the incoming data paths in the CPU 110 includes:

1. Loading the cache 120 with the diagnostic test program, for example, from the ATE 160, while preventing the CPU 110 from executing the diagnostic test program until it has been totally loaded into the cache 120.
2. Releasing the CPU 110 to enable full speed path execution of the diagnostic test program from the cache 120.
3. Enabling data read-back to the CPU 110.
4. Start the pseudo-random pattern generator 510 generating successive data for every bus cycle.
5. Requesting that data be read from the memory controller 130 by the diagnostic test program in the CPU 110.
6. Generating bus cycles using the BSA 410 as a pseudo-random pattern generator and transmitting the bus cycles to the CPU 110 along with the requested data.
7. Receiving in the CPU 110 the incoming data and bus cycles from the memory controller 130 and BSA 410.
8. Compressing the memory data in the CPU 110 to create a signature when valid bus cycles are also received.
9. Downloading the signature to the ATE 160 from the CPU 110.
10. Comparing the downloaded signature to an expected signature.

Figure 6:
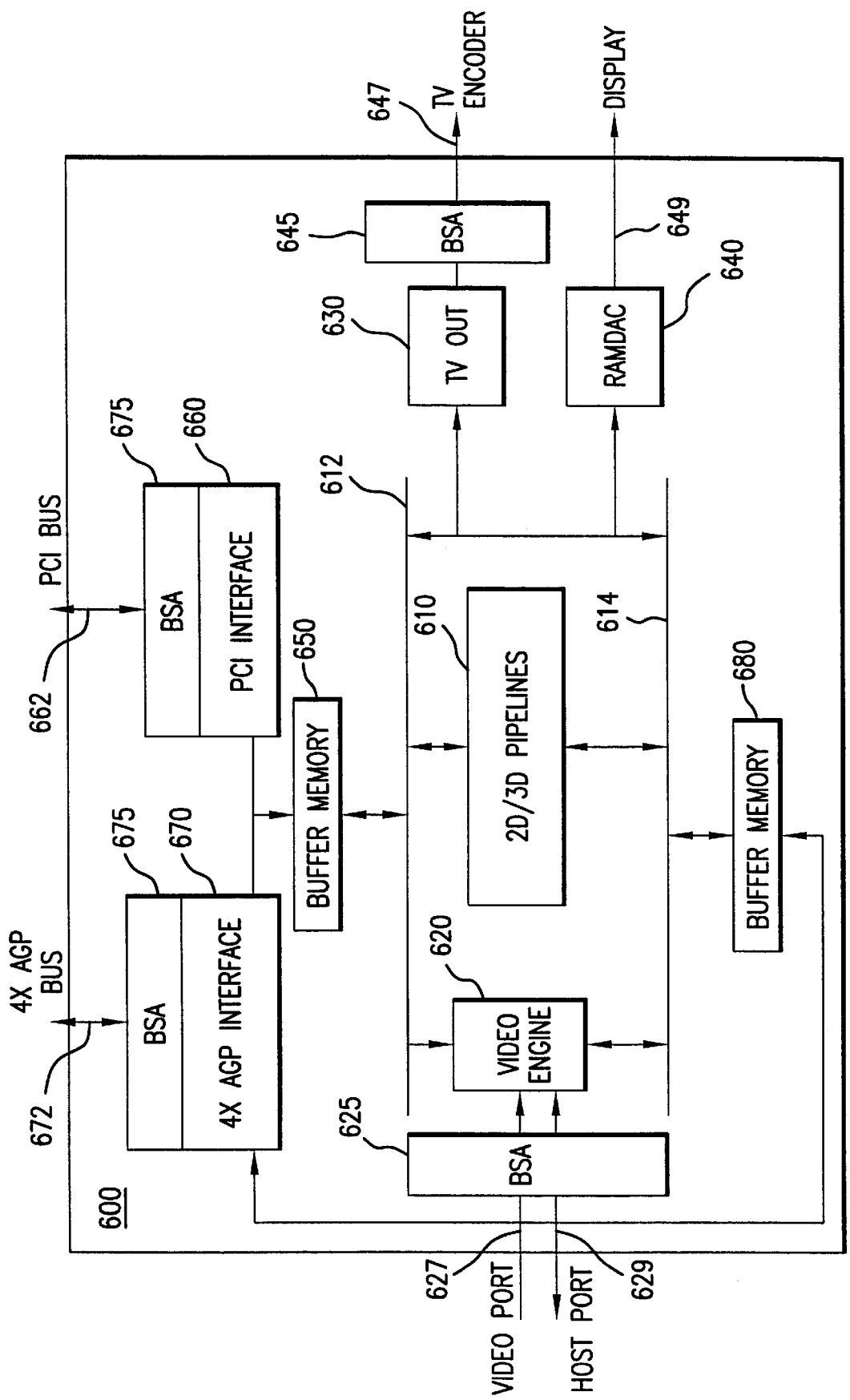
FIG. 6 is an illustration of an embodiment of a plurality of single BSAs configured to test outgoing data paths in a graphics co-processor in accordance with the present invention.

FIG. 6 is a functional block diagram illustration of a plurality of BSAs configured to test various outgoing data paths in a graphics co-processor 600 in accordance with an embodiment of the present invention. In FIG. 6, the specific embodiment of the graphics co-processor 600 is merely provided as an illustration of how a plurality of BSAs can be implemented and is not intended to restrict the present invention to only this implementation. In FIG. 6, the graphics coprocessor 600 is shown to include a two-dimensional (2D)/three-dimensional (3D) pipeline block 610 which is coupled to a first bus 612 and a second bus 614. A video engine 620 is similarly coupled to the first bus 612 and the second bus 614. The video engine 620 is also coupled to a first BSA 625 via an input video port 627 and a bi-directional host port 629. The first BSA 625 can be used to test the performance of the outgoing data paths of the video engine 620 and produce a signature or signatures to be output and compared against known defect-free video engine signatures. A TV Out 630 is also shown coupled to the first bus 612 and the second bus 614 and to a second BSA 645 via a TV encoder output 647. A Random Access Memory Digital-to-Analog Converter (RAMDAC) 640, which can convert digital image data into analog data for display on a computer display, is also coupled to the first bus 612 and the second bus 614 and to a display (not shown) via a display output 649. As with the first BSA 625, the second BSA 645 can be used to test the performance of the outgoing data path of the TV Out 630 to produce a signature which can be output and compared against a known defect-free TV Out 630 signature. The RAMDAC 640 output cannot be tested with the BSA 645 since the output is an analog signal and the BSA 645, or any BSA, can only work with digital signals. In general, a BSA can be used for I/O pins and, as long as it is used with the bus valid signal, the BSA will compress only outgoing signals. In addition, the use of the BSA can allow the tester channels to be simpler since the tester only has to deal with providing input to the device under test.

In FIG. 6, a first buffer memory 650 is coupled to the first bus 612 and to a Peripheral Component Interconnect (PCI) interface 660, which is in turn coupled to a PCI bus 662. The current PCI specification is defined in Special Interest Group (SIG) PCI Local Bus Specification, revision 2.2, published Jan. 25, 1999. The PCI interface 660 is coupled to a third BSA 665, which is in turn coupled to the PCI bus 662. The buffer memory 650 is also shown coupled to an Intel Corporation Accelerated Graphics Port (AGP) Intel Specification, revision 2.0, published May 4, 1998, AGP-4X (AGP-4X) interface 670, which is in turn coupled to an AGP-4X bus 672. The AGP-4X interface 670 is coupled to a fourth BSA 675, which is coupled to the AGP-4X bus 672. The fourth BSA 675 can be used to test the performance of the outgoing data paths of the AGP-4X bus 672 and the AGP-4X interface 670 and produce a signature or signatures to be output and compared against known defect-free signatures for the AGP-4X bus 672 and the AGP-4X interface 670. A second buffer memory 680 is coupled to the AGP-4X interface 670 and the second bus 614.

While the embodiment of FIG. 6 illustrates four BSAs coupled to each of the digital output ports, other embodiments of the present invention are possible in which fewer than four BSAs are implemented.

Figure 7:
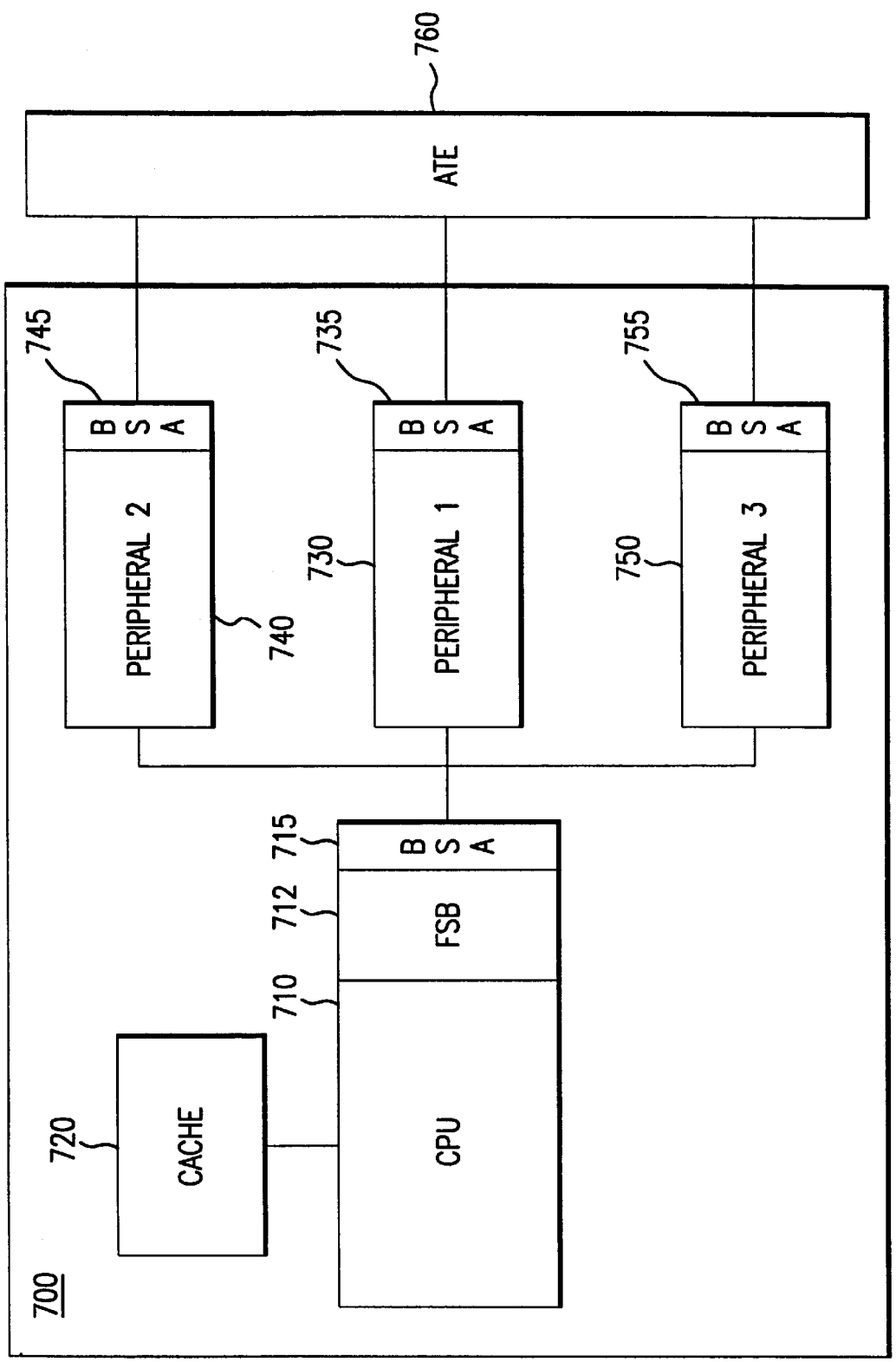
FIG. 7 is an illustration of an embodiment of a plurality of BSAs in a single-chip processor system to test a plurality of outgoing data path's performance in accordance with the present invention.

FIG. 7 is an illustration of a generic embodiment in accordance with the present invention of a plurality of BSAs in a single chip processor 700 system to test a plurality of outgoing data paths. Similar to FIG. 3, in the embodiment of the present invention illustrated in FIG. 7, a CPU 710 is coupled to an external cache 720. In another embodiment of the present invention, the cache can be embedded in the CPU 710. The CPU 710 is also coupled to a front side bus FSB 712 and a CPU BSA 715, which can be used to test the incoming and outgoing data paths of the CPU 710. The CPU 710 is further coupled to a first peripheral 730, a second peripheral 740 and a third peripheral 750. The first, second and third peripherals 730, 740 and 750 are each coupled to a first BSA 735, a second BSA 745 and a third BSA 755, respectively. Each of the first, second and third peripherals 730, 740 and 750, respectively, can be individually coupled to an external ATE (not shown) to load the diagnostic test program and to unload the signature information for comparison. In another embodiment of the present invention, the diagnostic test program can be stored on the chip, for example, in firmware to enable direct loading into the cache 720. Similarly, each of the first BSA 735, the second BSA 745 and the third BSA 755, are coupled to an ATE 760. In embodiments of the present invention, a diagnostic test program can be loaded into the cache 120 from the ATE 760 via one of the first, second and/or third peripherals, 730, 740 and 750, respectively. As in other embodiments of the present invention, the CPU 710 is prevented from executing the diagnostic test program until it is completely loaded into the cache 720. In embodiments of the present invention illustrated in FIG. 7, each of the BSAs 715, 735, 745 and 755 can generate signatures based on outgoing data generated by whichever diagnostic test program is loaded into the cache 720 for execution by the CPU 710

Figure 8:
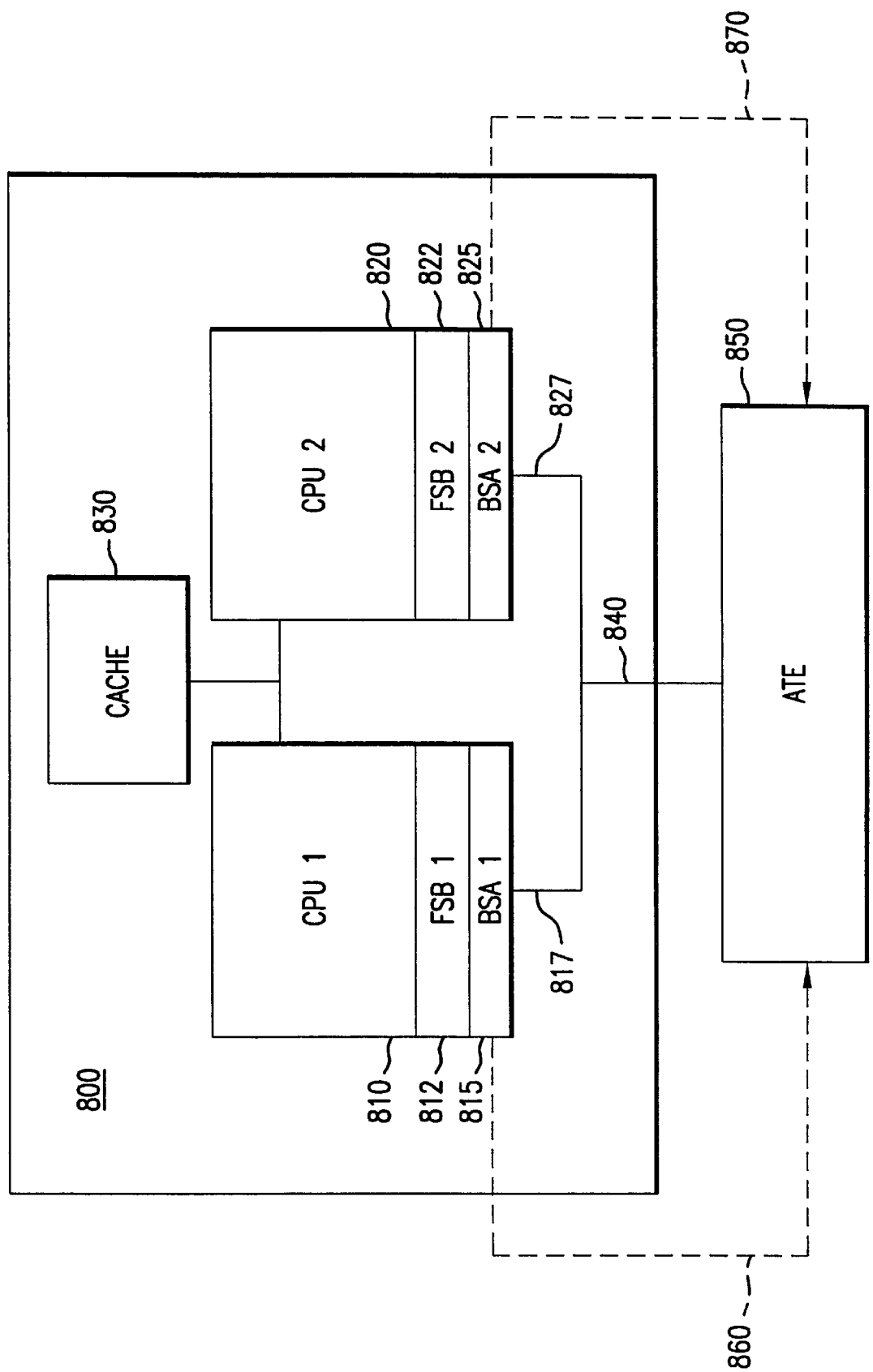
FIG. 8 is an illustration of an embodiment of a plurality of BSAs in a single-chip multi-processor system to test an outgoing data path in accordance with the present invention.

FIG. 8 is an illustration of an embodiment in accordance with the present invention of a BSA configuration to test an outgoing data path in a single-chip multi-processor 800 system. In FIG. 8, a first CPU 810 and a second CPU 820 are both coupled to a cache 830. While in this embodiment of the present invention, the cache 830 is shown as being separate from the first and second CPUs 810 and 820 respectively, the embodiment is merely intended to be illustrative and should not be considered to limit the present invention to only this configuration. For example, in alternate embodiments, separate caches can be separately coupled to or embedded on each CPU 810 and 820. The first and second CPUs 810 and 820, respectively, are each in turn coupled to a first FSB 812 and a second FSB 822, respectively. The first and second FSBs 812 and 822, respectively, are each in turn coupled to a first BSA 815 and a second BSA 825, respectively. Both the first BSA 815 and the second BSA 825 are coupled to a bus 840 via buses 817 and 827, respectively, to communicate external to the multi-processor 800. In this embodiment of the present invention, the bus 840 is coupled to an ATE 850 to enable the loading of a diagnostic test program and the subsequent downloading of signature(s) created in the BSAs 815 and 825. However, in this embodiment of the present invention, due to bus contention issues caused by the first and second CPUs 810 and 820, respectively, sharing the cache 830, the bus 840 and the ATE 850, either the combined operation of the entire multi-processor 800 or only one of the first and second CPUs 810 and 820 can be tested at a time. Additionally, to be able to test only one CPU at a time, the multi-processor 800 must be able to selectively prevent the CPU not being tested from executing program code in order to permit the necessary uninterrupted operation of the CPU being tested. As with the single processor, modifications to the multi-processor 800 control logic can be made to prevent the CPU(s) being tested from beginning execution before the test program has been completely loaded into the cache 830 and, also, to enable the multi-processor 800 to selectively disable the CPUs, as necessary.

In an alternative embodiment, BSAs 815 and 825 can be separately and directly coupled to the ATE 850, as shown by dashed lines 860 and 870, respectively. In other embodiments of the present invention, each of the BSAs 815 and 825, respectively, can be coupled to separate ATEs (not shown).

In accordance with an embodiment the present invention, a device for performing high-speed functional testing of an integrated circuit includes a serially-connected MISR with a feedback circuit coupled to an output of the MISR to receive an output signal and the feedback circuit coupled to at least one of a plurality of inputs of the MISR to feedback the output signal. The device also includes a control circuit, which is coupled to the MISR, to enable the MISR to compress an incoming data signal on a valid bus cycle.

In accordance with an embodiment the present invention, a method of performing high-speed functional testing of an integrated circuit includes preventing the integrated circuit from executing a program, loading a memory coupled to the integrated circuit with a test program, enabling the integrated circuit to execute the test program, executing the test program by the integrated circuit, generating bus cycles, capturing and compressing the bus cycles into a signature on a valid bus cycle, and outputting the signature.

In accordance with an embodiment the present invention, a computer system to perform high-speed functional testing of integrated circuits includes a processor, a memory coupled to the processor, a bus coupled to the processor, and a BSA coupled to the bus to receive an output signal from the processor and to compress the output signal into a signature on a valid bus cycle.

In accordance with an embodiment the present invention, a multi-processor computer system for performing high-speed functional testing includes a first processor, a second processor, a first bus coupled to the first processor, a second bus coupled to the second processor, a memory coupled to the first and second processors, a first BSA coupled to the first bus to receive a first output signal from the first processor and to compress the first output signal into a signature on a valid bus cycle, a second BSA coupled to the second bus to receive a second output signal from the second processor and to compress the second output signal into a signature on a valid bus cycle.

It should, of course, be understood that while the present invention has been described mainly in terms of microprocessor-based personal computer systems, those skilled in the art will recognize that the principles of the invention may be used advantageously with alternative embodiments involving other integrated processor chips and computer systems. Accordingly, all such implementations which fall within the spirit and the broad scope of the appended claims will be embraced by the principles of the present invention.

What is claimed is:

1. A device for performing high-speed functional testing of an integrated circuit, comprises:
   a serially-connected multiple input signature register (MISR), including a feedback circuit coupled to an output of said MISR to receive an output signal and said feedback circuit coupled to at least one of a plurality of inputs of said MISR to feedback to said plurality of inputs said output signal; and
   a control circuit coupled to said MISR, said control circuit to enable said MISR to compress an incoming data signal only on a valid bus cycle.

2. The device of claim 1 further comprises:
   an output port coupled to said MISR, said output port to output a test signature, wherein the test signature results from the compressed output signals.

3. The device of claim 1, wherein said MISR further comprises:
   a plurality of flip-flops coupled in series.

4. The device of claim 3, wherein each of said plurality of flip-flops is a D-type flip-flop.

5. The device of claim 3, wherein a first of said flip-flops is coupled to a first exclusive OR (XOR) gate to receive an output from said first XOR gate, and said first XOR gate is coupled to a first test input signal line and said feedback circuit from said MISR.

6. The device of claim 5, wherein a second of said flip-flops is coupled to a second XOR gate to receive an output from said second XOR gate, and said second XOR gate is coupled to a second test input signal line and said first flip-flop.

7. The device of claim 6, wherein said second XOR gate is further coupled to said feedback circuit from said MISR.

8. The device of claim 1, wherein said control circuit comprises:
   an AND gate adapted to receive a clock cycle input and a valid bus cycle input and an output to transmit an enable signature creation control signal.

9. A method of performing high-speed functional testing of an integrated circuit, comprising:
   preventing said integrated circuit from executing a program;
   loading a memory coupled to said integrated circuit with a test program;
   enabling said integrated circuit to execute said test program;
   executing said test program by said integrated circuit;
   generating bus cycles;
   capturing and compressing said bus cycles into a signature on a valid bus cycle; and
   outputting said signature.

10. The method of claim 9, wherein said loading a memory coupled to said integrated circuit with a test program occurs at a low bus fraction.

11. The method of claim 9, further comprising:
    comparing said signature to a known correct signature to determine if said integrated circuit is operating correctly.

12. The method of claim 9, wherein said running said test program occurs at a full speed of said integrated circuit.

13. The method of claim 9, wherein said generating bus cycles comprises:
    generating write bus cycles from said integrated circuit to a peripheral device.

14. The method of claim 9, wherein said generating bus cycles comprises:
    generating read bus cycles from a peripheral device to said integrated circuit.

15. The method of claim 9, further comprising:
    coupling an automatic test equipment (ATE) device to said integrated circuit, wherein said ATE is used to load said test program and receive said output signature.

16. A computer-readable medium having stored therein a computer program to perform high-speed functional testing of an integrated circuit comprising:
    preventing said integrated circuit from executing a program;
    loading a memory coupled to said integrated circuit with a test program;
    enabling said integrated circuit to execute said test program;

executing said test program by said integrated circuit;

generating bus cycles;

capturing and compressing said bus cycles into a signature on a valid bus cycle; and outputting said signature.

17. The computer-readable medium of claim 16, wherein said loading a memory coupled to said integrated circuit with a test program occurs at a low bus fraction.

18. The computer-readable medium of claim 16, further comprising:

comparing said signature to a known correct signature to determine if said integrated circuit is operating correctly.

19. The computer-readable medium of claim 16, wherein said running said test program occurs at a full speed of said integrated circuit.

20. The computer-readable medium of claim 16, wherein said generating bus cycles comprises:

generating write bus cycles from said integrated circuit to a peripheral device.

21. The computer-readable medium of claim 16, wherein said generating bus cycles comprises:

generating read bus cycles from a peripheral device to said integrated circuit.

22. The computer-readable medium of claim 16, further comprising:

coupling an automatic test equipment (ATE) device to said integrated circuit, wherein said ATE is used to load said test program and receive said output signature.

23. A computer system to perform high-speed functional testing, comprising:

a processor;

a memory coupled to said processor;

a bus coupled to said processor; and a bus signature analyzer (BSA) coupled to said bus to receive an output signal from said processor and to compress said output signal into a signature only on a valid bus cycle.

24. The computer system of claim 23, wherein said memory is a cache memory.

25. The computer system of claim 23, further comprising:

an output port coupled to said BSA to output said signature.

26. The computer system of claim 23, wherein said BSA comprises:

a plurality of flip-flops coupled in series;

a feedback circuit coupled to a last flip-flop in said plurality of flip-flops to receive an output signal and said feedback circuit coupled to at least one of said plurality of flip-flops to feedback said output signal; and a control circuit coupled to each of said plurality of flip-flops, wherein said control circuit enables said plurality of flip-flops to compress an incoming data signal on a valid bus cycle.

27. A multi-processor computer system to perform high-speed functional testing, comprising:

a first processor;

a second processor;

a first bus coupled to said first processor;

a second bus coupled to said second processor;

a memory coupled to said first and second processors;

a first bus signature analyzer (BSA) coupled to said first bus to receive a first output signal from said first processor and to compress said first output signal into a first signature on a valid bus cycle; and a second BSA coupled to said second bus to receive a second output signal from said second processor and to compress said second output signal into a second signature on said valid bus cycle.

28. The multi-processor computer system of claim 27, wherein said memory is a cache memory.

29. The multi-processor computer system of claim 27, further comprising:

a first output port coupled to said first BSA to output said first signature; and a second output port coupled to said second BSA to output said second signature.

30. The computer system of claim 27, wherein each of said first and second BSAs comprises:

a plurality of flip-flops coupled in series;

a feedback circuit coupled to a last flip-flop in said plurality of flip-flops to receive an output signal and said feedback circuit coupled to at least one of said plurality of flip-flops to feedback said output signal; and a control circuit coupled to each of said plurality of flip-flops, wherein said control circuit enables said plurality of flip-flops to compress an incoming data signal on a valid bus cycle.

* * * * *